(12) United States Patent
Halvorsen et al.

(10) Patent No.: US 8,258,421 B2
(45) Date of Patent: Sep. 4, 2012

(54) SHIELDING GAS FLOW CONTROLLER FOR A WELDING APPARATUS

(75) Inventors: Arild Halvorsen, Averoy (NO); Magne Farstad, Molde (NO)

(73) Assignee: Weltec AS, Averoy (NO)

(*) Notice: Subject to any disclaimer, the term of this patent is extended or adjusted under 35 U.S.C. 154(b) by 273 days.

(21) Appl. No.: 12/676,251

(22) PCT Filed: Sep. 1, 2008

(86) PCT No.: PCT/NO2008/000308
§ 371 (c)(1),
(2), (4) Date: Jun. 18, 2010

(87) PCT Pub. No.: WO2009/031902
PCT Pub. Date: Mar. 12, 2009

(65) Prior Publication Data
US 2010/0276398 A1 Nov. 4, 2010

(30) Foreign Application Priority Data
Sep. 3, 2007 (NO) .................................. 20074477

(51) Int. Cl.
B23K 9/00 (2006.01)
(52) U.S. Cl. ....... 219/74; 219/54; 219/132; 219/121.55; 219/121.63
(58) Field of Classification Search ............... 219/54, 219/74, 121.55, 121.63, 132
See application file for complete search history.

(56) References Cited

U.S. PATENT DOCUMENTS

| | | | |
|---|---|---|---|
| 4,278,864 A | 7/1981 | De Facci et al. | |
| 6,423,936 B1 | 7/2002 | Reed | |
| 7,019,248 B1 | 3/2006 | Uttrachi | |
| 2005/0224466 A1* | 10/2005 | Halvorsen | 219/74 |

FOREIGN PATENT DOCUMENTS

| | | |
|---|---|---|
| DE | 4216075 A1 | 11/1993 |
| DE | 10336651 A1 | 5/2005 |
| JP | 5318130 A | 12/1993 |
| JP | 2005-34895 | 2/2005 |
| NO | 20021557 | 7/2002 |
| NO | 20070472 | 1/2007 |
| WO | 03/082509 | 10/2003 |
| WO | 2008091160 A1 | 7/2008 |

OTHER PUBLICATIONS

International Search Report dated Jan. 9, 2009, from corresponding PCT application.

* cited by examiner

*Primary Examiner* — Julia Slutsker
(74) *Attorney, Agent, or Firm* — Young & Thompson

(57) ABSTRACT

A shielding gas (SG) flow controller for an arc welder includes SG input/output with a controllable valve therebetween, and having a control input, and a controller having a first input receiving a welding signal representing arc current and a gas flow setting controller generating a flow setting output based on the welding signal, representing a desired SG flow. Input and output pressure sensors provide SG input and out pressure to second and third controller inputs, respectively. A flow setting output modifier modifies the flow setting output of the gas flow setting controller based on the SG input/output pressure, the welding signal, and a characteristic of the controllable valve into a control signal input to the control input of the controllable gas valve to maintain a substantially constant SG flow corresponding to the flow setting output substantially independent of actual SG input/output pressures.

11 Claims, 10 Drawing Sheets

Figure 1:
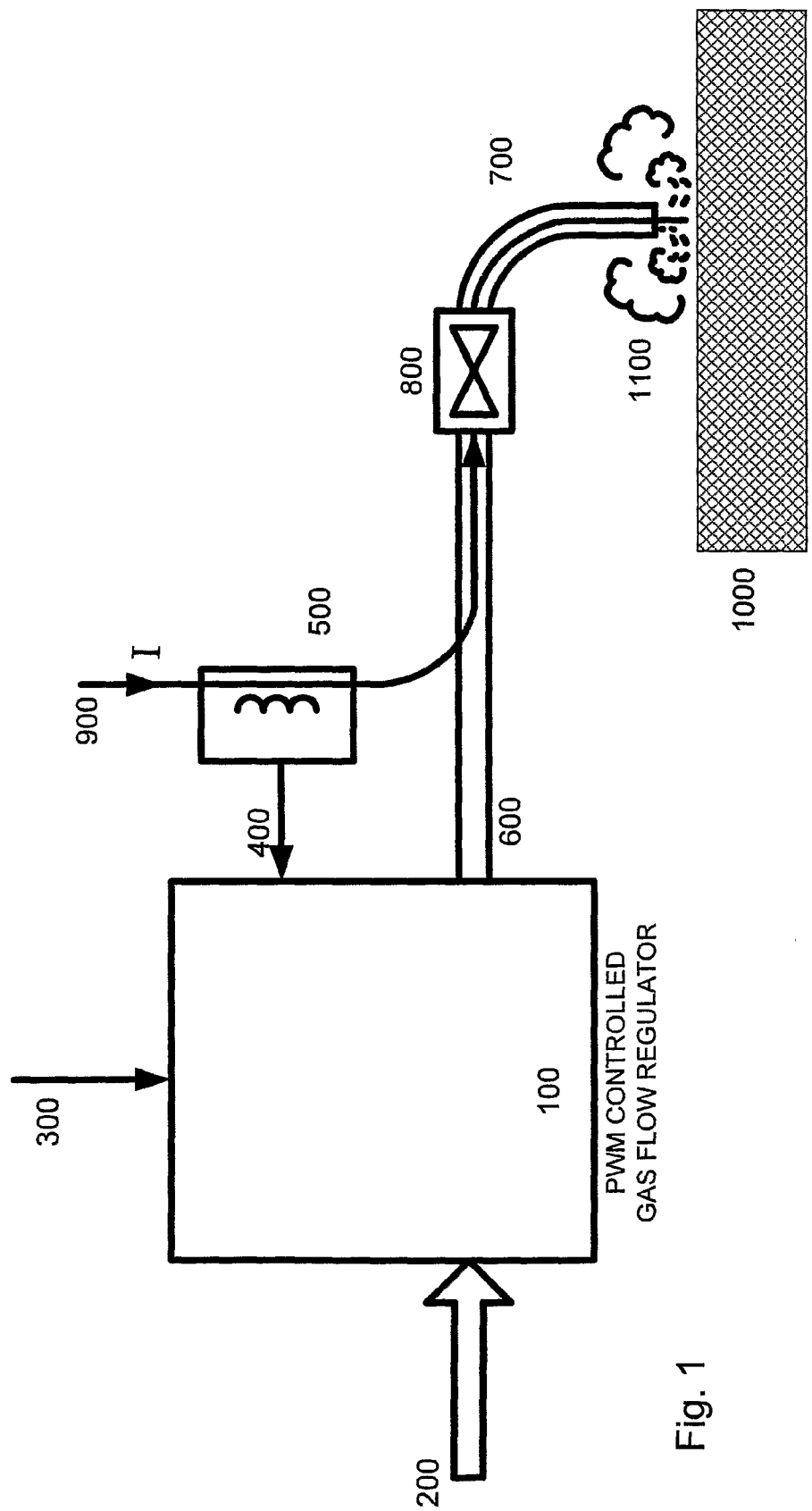

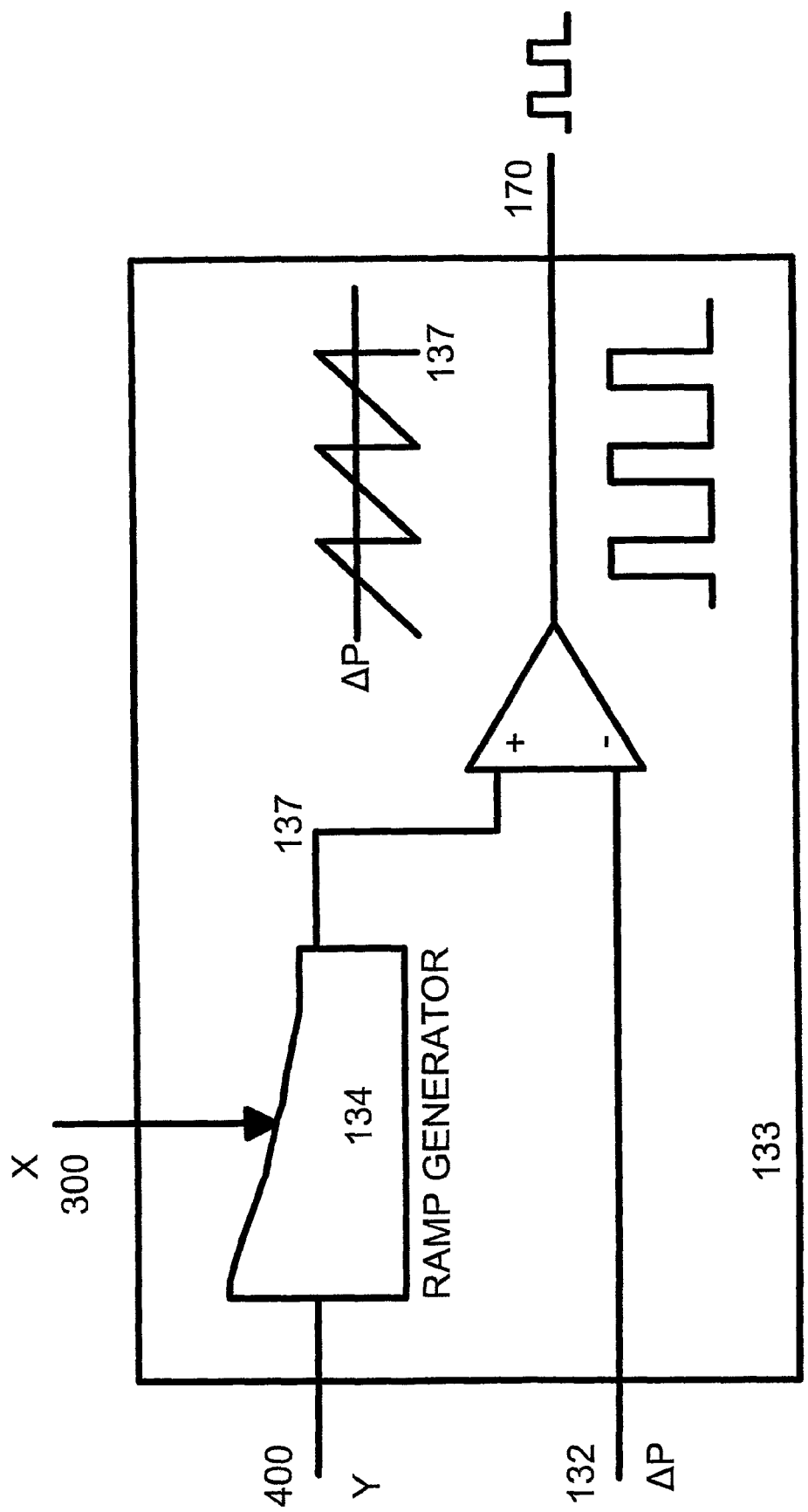
Fig. 4 Hardware Regulation

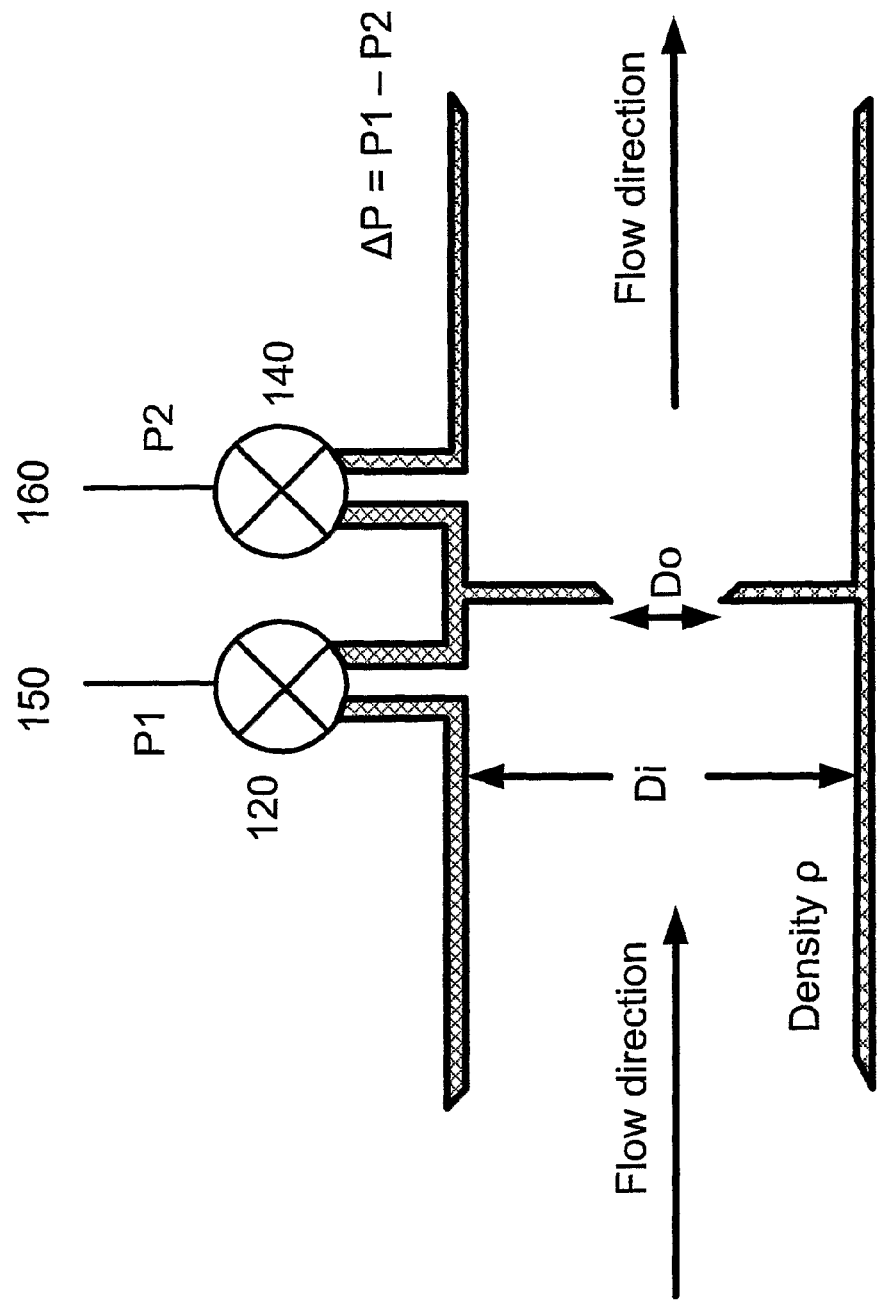
Fig. 5  Measurement of Gas Flow and Pressure

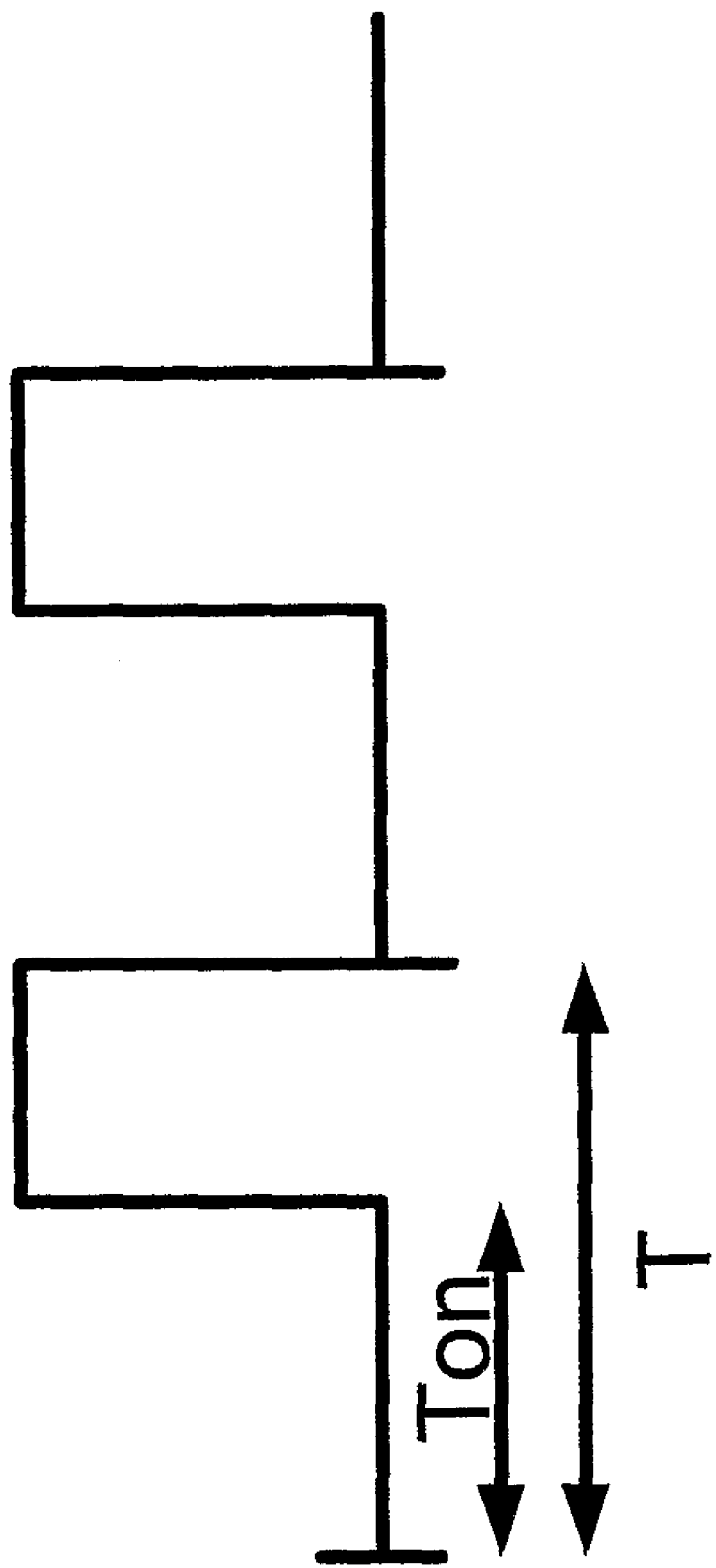
Fig. 6 PWM Control

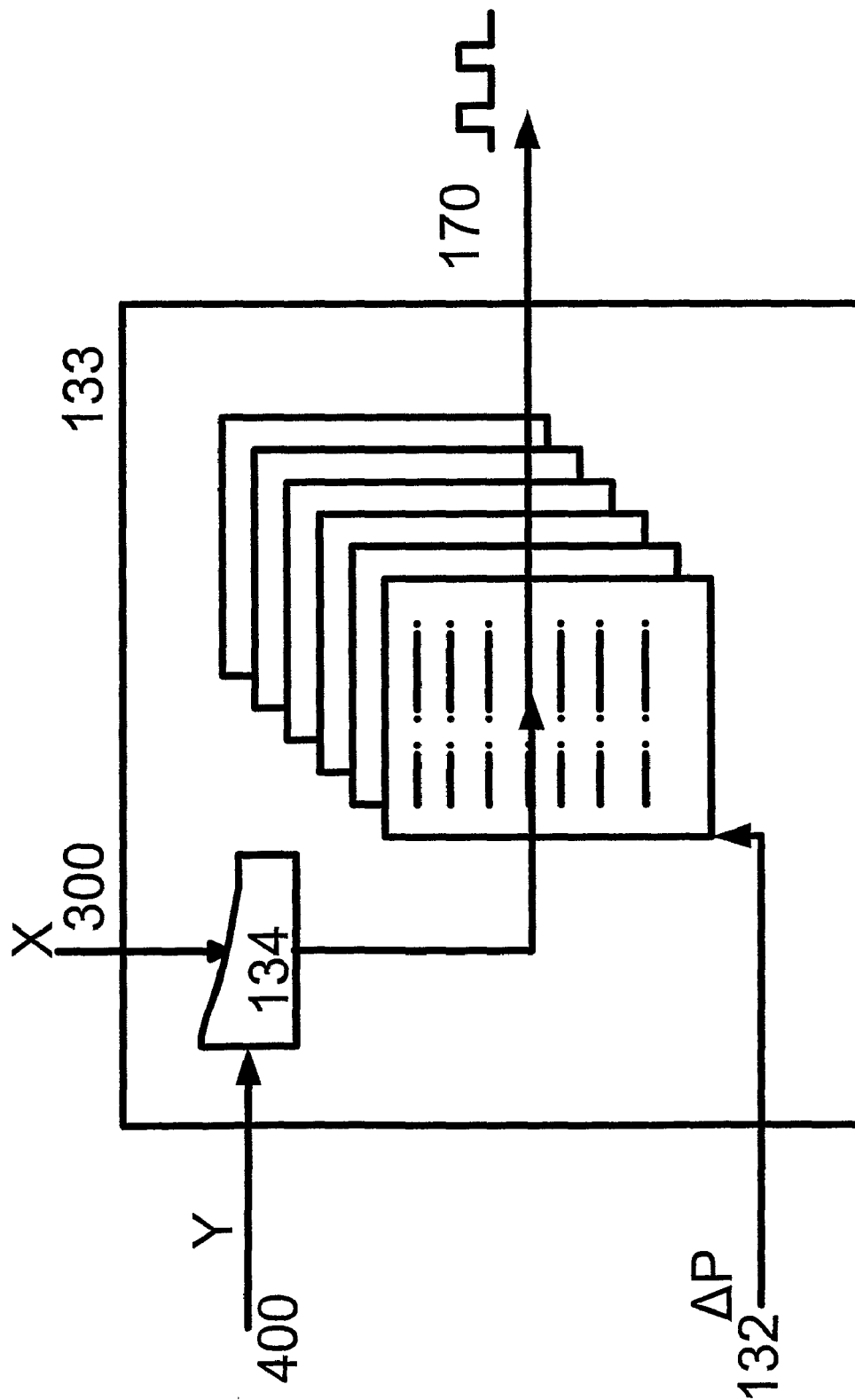
Fig. 7 Look Up Table regulation

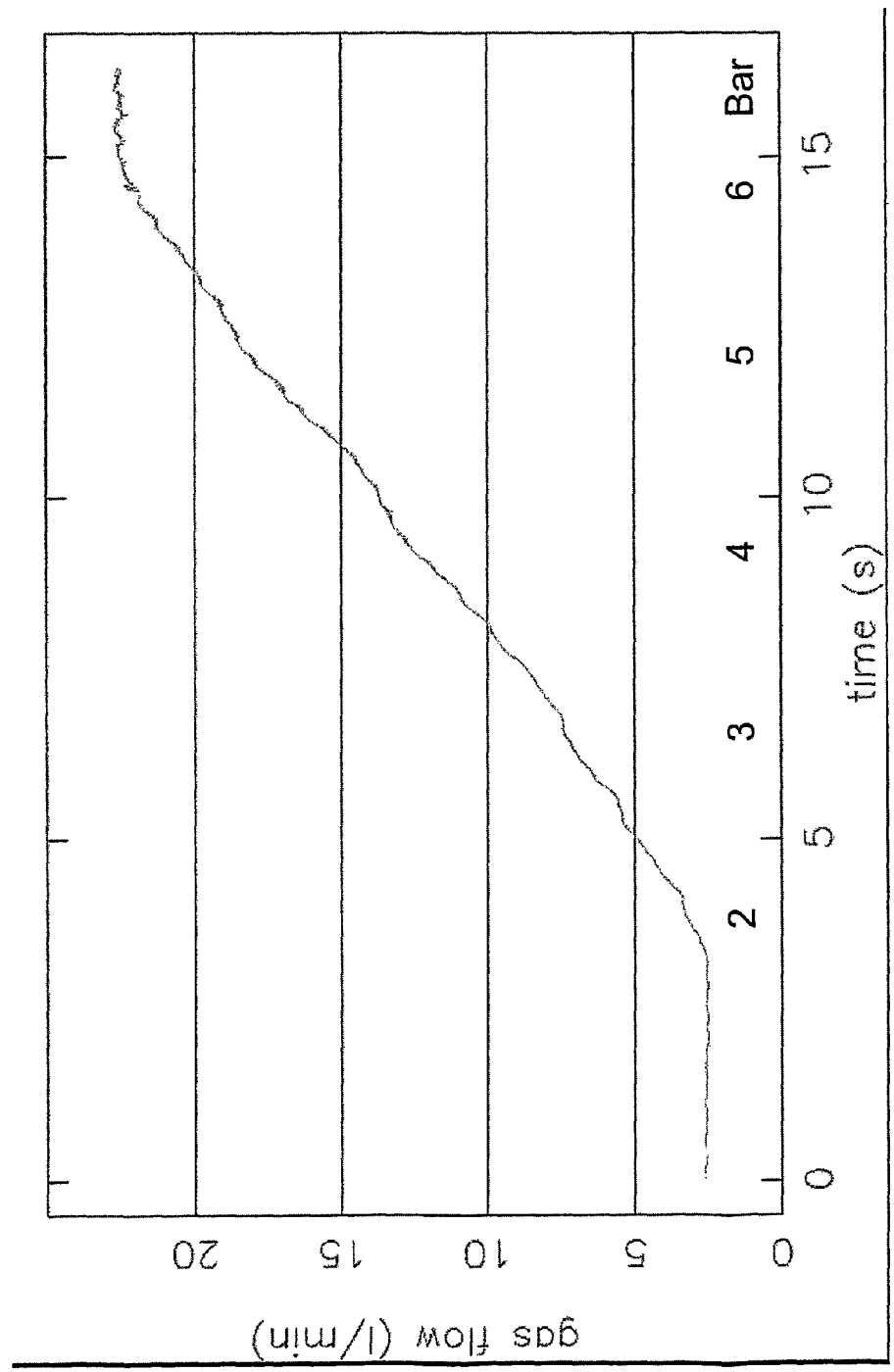
Fig. 8 Gas Flow through the valve 110 with no pressure regulation and a pressure rise from 2 to 6 bar

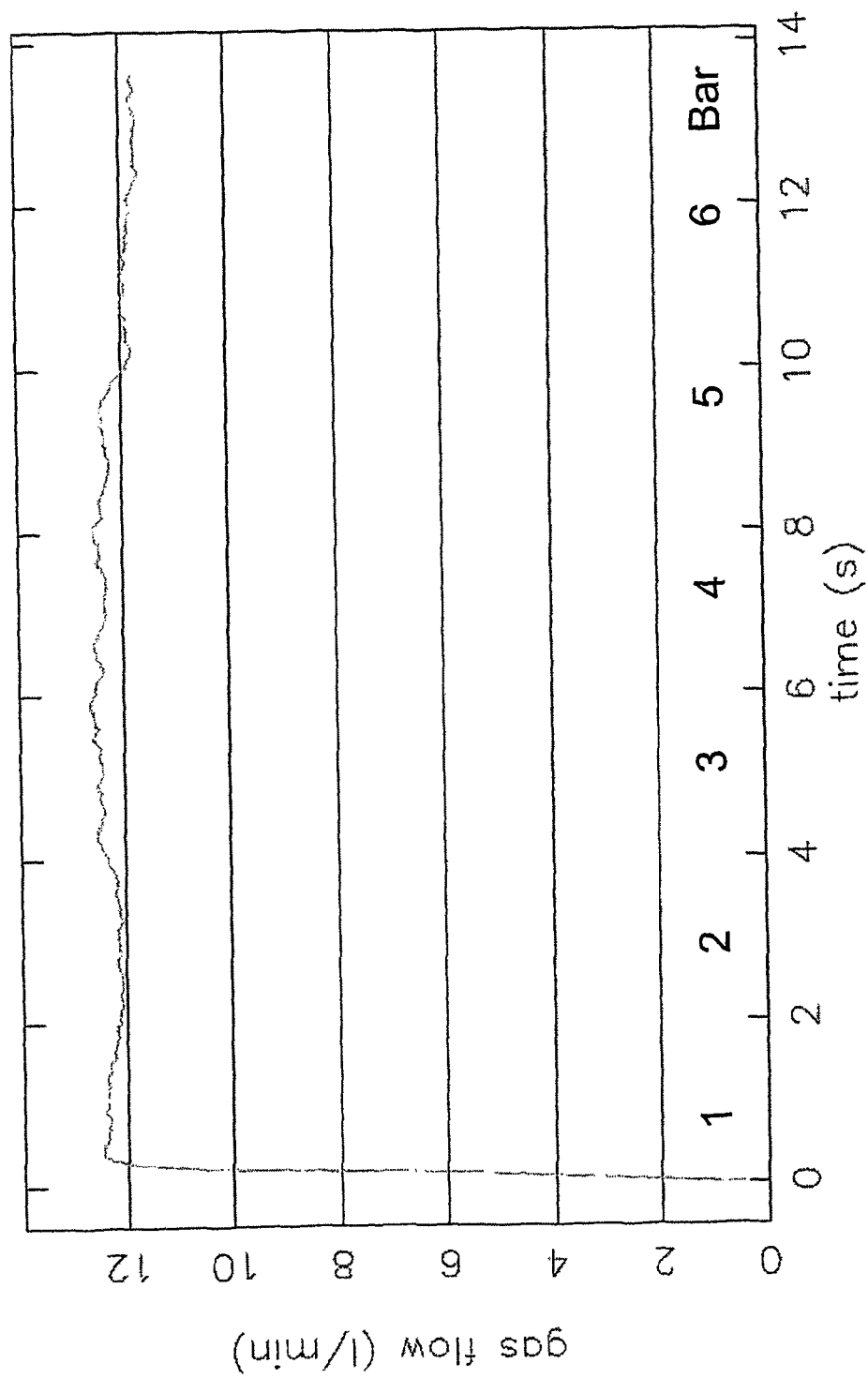
Fig. 9 Gas Flow through the valve 110 with pressure regulation and a pressure rise from 0 to 6 bar

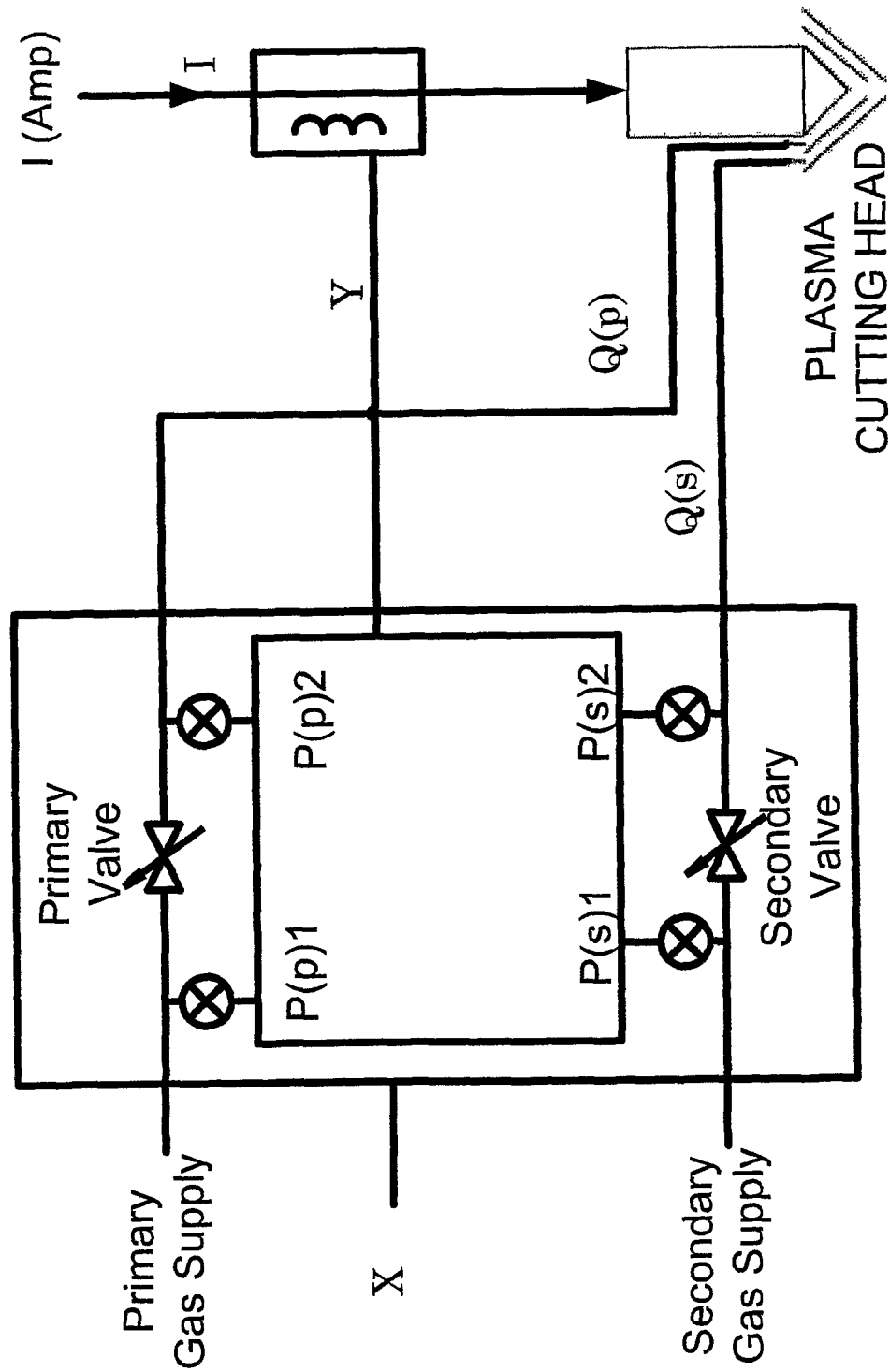
Fig. 10 Illustration of gas regulation of a Plasma cutting machine

SHIELDING GAS FLOW CONTROLLER FOR A WELDING APPARATUS

The present invention relates to the field of providing blanket gas, also referred to as shielding gas or active gas, to a welding point in an electrical welding apparatus, particularly to a method and device for controlling blanket gas shielding gas; active gas flow in various stages of a welding operation. The field of the invention may also relate to gas regulation for plasma cutting machines where the flow of cutting gas (primary gas), blanket gas (secondary gas) or both of the aforementioned is controlled by using the technical solution provided by the present invention.

For electrical welding operations where the welding point is to be provided with a blanket of inert blanket gas, it is common to provide the blanket gas from a centralized blanket gas supply installation, or from a gas cylinder located in the vicinity of the welding machine unit of the welding apparatus. The blanket gas provided by the supply installation or the gas cylinder typically is provided with a regulated gas pressure that exceeds the pressure at which the blanket gas can be controlled by the blanket gas control means of the welding apparatus. In order to reduce the pressure to level at which the gas conveniently can be delivered to the welding apparatus, and be controlled by a control valve in the welding apparatus switching on and off the flow of blanket gas, a pressure reduction device is inserted in the blanket gas supply line in a location proximal to the gas cylinder or the gas supply installation. Thus, a section of the gas supply line, in which the gas is provided at a lower gas pressure than in the gas supply installation or gas cylinder, exists between the pressure reduction device and the welding machine itself. Typically, this "low pressure" section of the supply line is of a considerable length, in order to allow practical use of the welding machine unit, which often is required to be easily relocateable in order to reach differently located areas at which the welding work is to be performed. Further details with regard to the aspects of the low pressure supply line and the control of blanket gas supply for an electrical welding apparatus is provided in the present applicant Norwegian patent application no. 20021557, and corresponding applications claiming priority from the aforementioned application. In 20021557, a pulse width modulated signal driven valve controlled by the welding wire feed rate takes the place of the traditional shielding gas supply valve in an electrical arc welding apparatus.

The present applicants co-pending Norwegian patent application no. NO20070472 describes the use of a Pulse Width Modulated PWM valve technique for controlling gas flow.

For electrical welding operations where the gas flow is regulated according to a welding current and according to the selected welding operation, it is important that the gas flow is held above a minimum level to maintain a good quality of the welding. Aspects that will affect the flow in a gas supply chain, are in general the initial gas pressure and the gas-flow regulation performed by the regulator itself. In addition there may be variable or constant parameters that will affect the gas flow, and these are mainly pressure drop in the supply line both from the regulated gas supply to the regulator, and also pressure drop in the line from the regulator to the point of the gas outlet. It is possibly to add a flow sensor to measure the actual gas flow, and thereby compensate for the total pressure drop. The disadvantage is that flow sensors are expensive to introduce in a final product, and also the accuracy of the available flow sensors are variable and unpredictable depending on where they are placed in the gas flow line. This variation of accuracy is related to the pulsed gas-flow which interfere with the known flow measurement instruments.

The present invention describe a method to obtain a gas flow regulation that will overcome problems related to the above mentioned pressure drop. The same problems controlling the gas flow in plasma cutting operations will also be solved using the same regulation technique.

The present invention provides a gas flow controller for a welding apparatus exhibiting the features recited in the accompanying independent patent claim 1.

Further advantageous features of the gas flow controller of the invention are recited in the accompanying dependent patent claims 1-5.

A shielding gas flow controller according to the present invention for an electric arc welding apparatus is for insertion into a shielding gas supply line between a shielding gas source and a shielding gas valve of the electric arc welding apparatus. The flow controller has a shielding gas input and a shielding gas output, a controllable gas valve connected between the shielding gas in- and outputs and having a control input, and a controller means having a first input for receiving a welding signal representing an electrical welding arc current of the welding apparatus during a welding operation and a gas flow setting control means adapted to generate a flow setting output being function of the welding signal and representing a desired shielding gas flow. The shielding gas flow controller further comprises an input pressure sensor connected to the shielding gas input and arranged to provide a shielding gas input pressure measurement to a second controller means input, and an output pressure sensor connected to the shielding gas output and arranged to provide a shielding gas output pressure measurement to a third controller means input, and a flow setting output modifying means. The flow setting output modifying means is arranged to modify the flow setting output of the gas flow setting control means based on the shielding gas input and output pressure measurements, the welding signal, and a characteristic of the controllable valve into a control signal for input to the control input of the controllable gas valve so as to maintain during the welding operation a substantially constant shielding gas flow in the shielding gas supply line to the welding apparatus corresponding to the flow setting output substantially independent of actual shielding gas input and output pressures at the shielding gas in- and outputs, respectively.

Advantageously, the shielding gas flow controller also comprises a means adapted to determine a time at which the welding operation is not being performed on basis of the welding signal, and the controller means is adapted to output to the controllable gas valve an idle control signal so as to maintain the output pressure at a predetermined idle pressure level substantially during the time at which the welding operation is not being performed.

Advantageously, in an embodiment of the shielding gas flow controller of the invention, it comprises a gas leak detector means being adapted to be enabled during a period in which the welding operation is not being performed, and being adapted to determine the period on basis of the welding signal or based on output of another device monitoring the welding signal. The gas leak detector means includes a subtractor means arranged to subtract the shielding gas output pressure measurement from the shielding gas input pressure measurement, and to provide a pressure difference value output. A pressure difference comparator has a comparator output, and is arranged to receive on first and second comparator inputs the pressure difference value output and a predetermined pressure difference reference value, respectively. The comparator is adapted to provide on a comparator output a leak indication when the pressure difference value is substantially at or greater than the predetermined pressure difference reference value.

Figure 2:
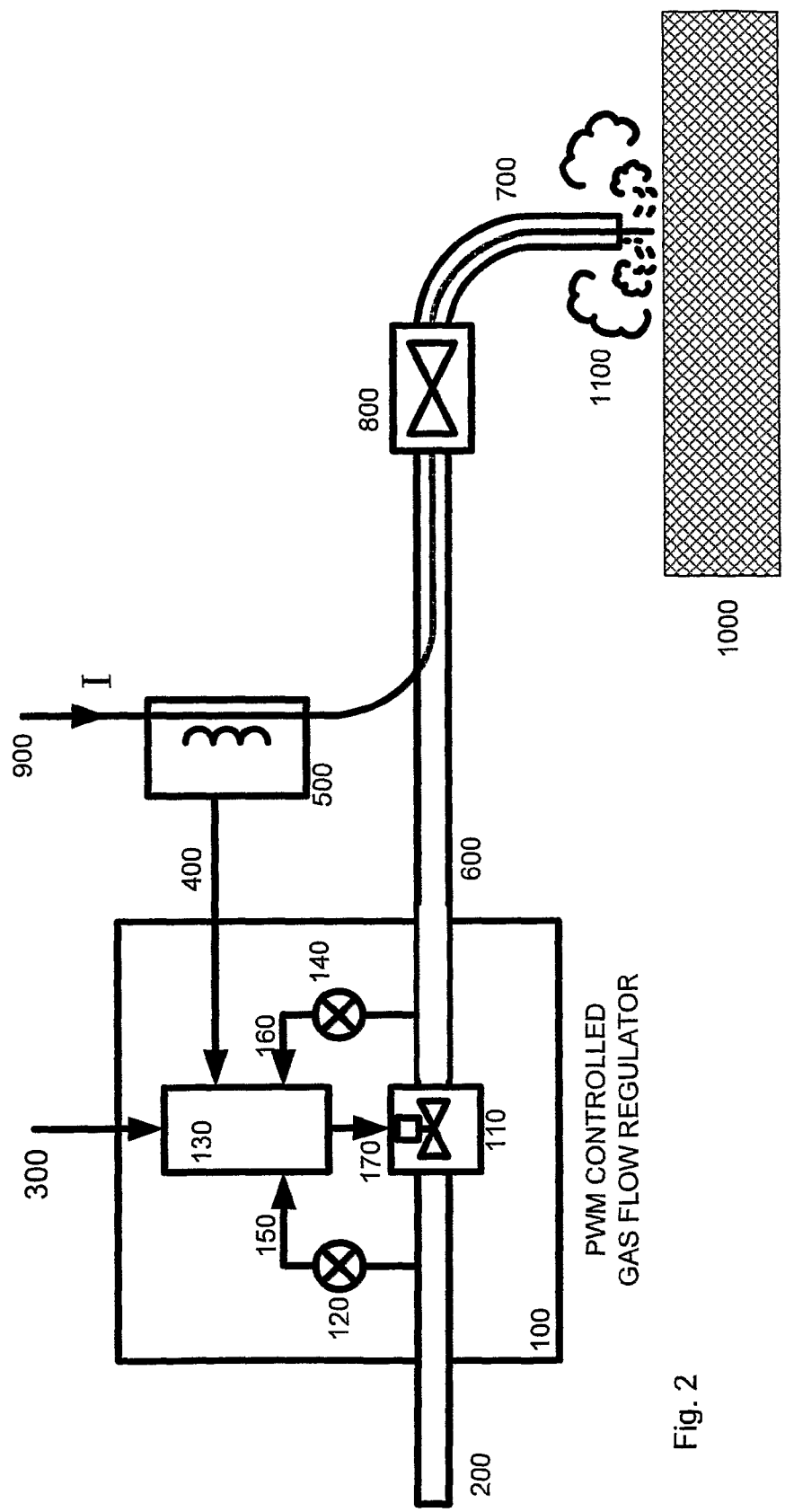
Figure 3:
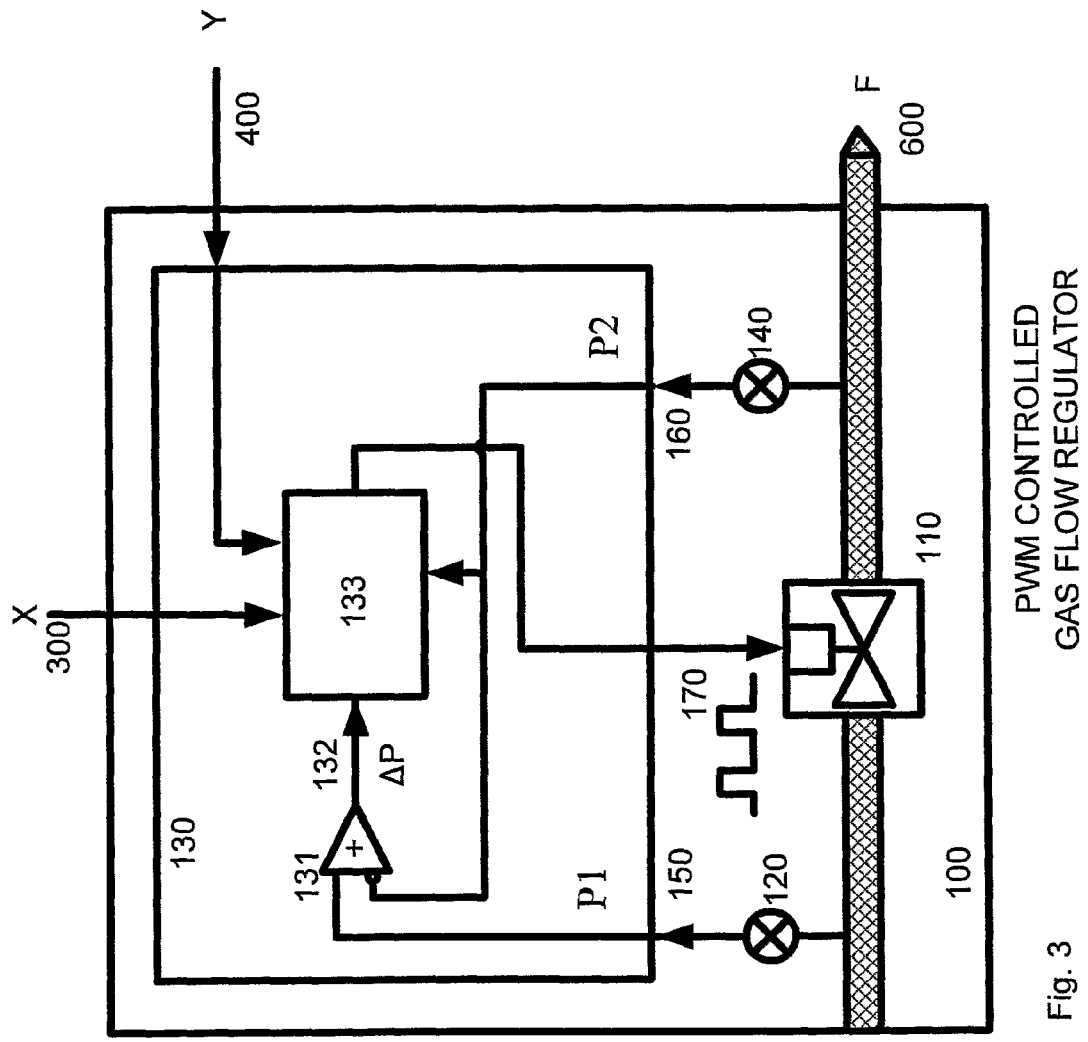

In a further embodiment of the shielding gas flow controller of the invention, it comprises a pressure level detector receiving the shielding gas input pressure measurement and being adapted to effect provisioning of a valve closing signal to the controllable gas valve so as to close the gas valve when the shielding gas input pressure measurement indicates a gas pressure being at or less than a predetermined shielding gas input pressure minimum level In the attached drawings, FIG. 1 is an overall block schematic of gas flow regulator 100 of the invention in a welding operation FIG. 2 is a detailed block schematic of the gas flow regulator 100 of the invention in a Welding operation illustrated in FIG. 1, FIG. 3 is a detailed block schematic of an exemplary embodiment of the gas flow regulator 100 of the invention, FIG. 4 is a detailed block schematic of an exemplary embodiment of the control unit of the gas flow regulator 100 of the invention based on a Hardware solution, FIG. 5 is an illustration of the physical setup with pressure sensors, valve orifice and flow direction, FIG. 6 is a graph illustrating on a time axis the PWM signal with respect to the period T where Ton is representing the valves ON-period, FIG. 7 is a block schematic drawing of the table look-up employed by the invention, FIG. 8 is a graph showing the flow through an exemplary embodiment of the flow regulator of the invention, the valve operated with a fixed PWM value and a variation of the input pressure from 2 to 6 bar, FIG. 9 is a graph illustrating gas flow through the valve of the gas regulator of an exemplary embodiment of the invention where the regulation of the PWM according to the value of the pressure sensors are included, and FIG. 10 is a block schematic drawing showing the gas regulation system of the invention embodied into a plasma cutting machine having two regulated gas flow lines.

Referring to FIGS. 1 and 2, the invention provides an improvement in gas flow stability, by automatically controlling the average time at which the valve is kept open, thereby reducing flow variations that typically are experienced in prior art welding gas supply installations where gas is supplied from a feeding point 200 that will be placed at a distance away from the regulator 100. In such prior art installations, it is common that the regulator 100 is placed at a considerable distance away from the gas final outlet point 1100. These distances will normally vary from one installation to another installation, and also the dimensions of the supply hoses, tubes, pipes, adapters and connector vary, and the result is that the gas flow level is influenced as shown by the measurement done in FIG. 8, and therefore the flow need to be regulated according to the pressure variations in order to keep the flow level within acceptable tolerances.

The gas flow controller of the present invention includes pressure sensors at the input (120) and the output (140), respectively, of the "PWM CONTROLLED GAS FLOW REGULATOR" 100. Herein, PWM is an acronym for "Pulse Width Modulated", corresponding to what is disclosed in the co-pending Norwegian patent application no. NO20070472.

The pulse width controlled gas flow regulator referred to above, in part employed by the present invention, includes a pulse train generator and a pulse train driven valve, typically comprising a solenoid. The pulse train has two states, the ON state (Ton) and the OFF state as described in FIG. 6. The duration (Ton, Toff), i.e. periods, of the aforementioned states may be varied by way one or more inputs to the pulse train generator. The valve is responsive to the aforementioned states, such that the valve assumes a substantially fully open state when driven by the ON state part of the pulse train, and a substantially fully closed state when driven by the OFF state part of the pulse train. By a suitable selection of the pulse repetition frequency of the pulse train, drive power dissipated in the valve is at a minimum, thereby improving the regulator performance.

In the disclosure of present invention provided herein, including the attached drawings, the pulse train driven valve is referred to by numeral 110, and the pulse train regulator is included as part of the valve controller arrangement being referred to herein by numeral 130.

With reference to FIG. 3, some operational aspects of the gas flow controller of the present invention are explained in the following.

To operate the gas flow controller of the present invention, the initial setting of the desired, or required gas flow level (Q) can either be by a reference input 300 from an operator or a control device, or it can be a measured feedback value 400 from another process that is determining the gas flow requirement.

An input pressure measurement of P1, at 150 the gas pressure at valve input 120 is fed to the valve controller arrangement 133 to adjust an ON-period 170 of the PWM-controlled valve 110, in order to obtain a constant gas flow 600.

An output pressure P2 measurement 160 of gas pressure at valve output 140 is used to provide a compensation for a reduction of the gas flow that typically is caused by constant or variable changes in the shape, such as cross section or length of the gas flow line, being constituted by hoses, pipes, and connections 600, 700, 800. If the amplitude (value) of the output pressure P2 is negligible (i.e. the value of P2 is so low that the PWM output variation is within acceptable limits) then this measurement can be left out of the regulation by setting the value of P2 to 0 atm (or 1 atm if absolute pressure value measurements are used), or if the variations of value of P2 are within acceptable limits, then the measurement of P2 can be replaced by a fixed value in the formula. An example is that if the output pressure P2 is measured to be e.g. 1.2 bar, then the formula could be $\Delta P = P1 - 1.2$. The advantages are to reduce the number of measurements points, which again reduce the product price and complexity.

A difference in gas pressure $\Delta P = P1 - P2$ between the input 120 and output 140 of the valve, obtained as a pressure difference value by subtracting in a subtractor 131 the output pressure measurement 160 from the input pressure measurement 150, is fed to a pressure difference input 132 of the valve controller arrangement 133, and used therein to calculate the gas flow through the valve 110 when the valve is open.

The regulation of the gas flow can be done according to different methods in the valve controller arrangement 133 such as:

a) look-up table for the required pulse width
b) a function formula, polynomial that calculate the pulse width
c) electronic hardware resulting in an improved flow regulation shown in FIG. 9, which show a dramatically improvement of the flow control compared to the unregulated flow shown in FIG. 8.

In the following, an embodiment of the invention involving the use of one or more look-up tables to determine the valve control signal will be explained with reference to FIG. 7.

The embodiment on the invention that employs look up tables, a set of values have been collected in previous measurements done for the actual fluids and components to be used. To collect the values for the tables, for different pressure levels of P1 and P2, the flow is measured and the resulting values are placed inside several look-up tables. The functionality of block 134, represents the process parameter Y and/or user input X is user/process specific, and ΔP=P1−P2.

The value of ΔP points to the table that must be used, and the process parameter (Y) and/or user input, (X) are used to select within the table the PWM output value (170). For a typical welding application ΔP will vary between 1-6 bar, and for plasma-cutting applications the ΔP may be up to 12 bar. The number of tables to be used will vary with the requirements for accuracy, but can typical be one table pr. 0.5-1 bar. It can be sufficient to use fewer tables by introducing an interpolation method between the tables, which by calculation will give PWM outputs for values of ΔP that lies inbetween the values in the available tables.

In the following, an embodiment of the invention involving the use of Calculation to determine the valve control signal will be explained with reference to FIG. 5.

The total block of 130 in FIG. 3 can be replaced by a calculation performed in a processor by way of suitable software. With reference to FIG. 5, a fluid passing through the orifice constriction represented by the valve's opening diameter Do, will experience a drop in pressure across this orifice. This pressure drop is used to measure the flow rate of the fluid when the valve is in its open stage. The calculation of the flow rate of gas passing through the orifice of the valve is typically based on Bernoulli's equation, combined with the ON-period (Ton) relative to a total switching period T as described in FIG. 6.

Bernoulli's equation can be modified to ease the calculation in a computer, and can by introducing a flow coefficient C(f), be written as:

$$Q(max)=C(f)*Ao*sqr(2*\Delta P/\rho)$$

where
Q(max)=maximum volumetric flow rate (valve constant open)
$Ao=\pi*(Do/2)^2$=area of valve opening (in open stage)
ΔP=P1−P2
ρ=Fluid density The flow coefficient C(f) is by experiment or in a datasheet for the actual orifice of the valve. In place of basing the determination of Q(max) and Ao on the physical characteristics of the valve itself, a separate orifice device may suitably be located directly at the gas input or gas output of the valve in such a way that the separate orifice device is the dominating element with regard to establishing Q(max) and Ao properties of the valve assembly.

Based on the required flow level Q for the particular application, which would correspond to the desired gas flow, the ON-period (Ton) for the PWM modulated valve is be calculated by:

$$Q=Q(max)*T(on)/T$$

$$T(on)=T*Q/Q(max)$$

The pulse rate of the PWM output (170) are chosen based on the flow requirements for the application. The pulsation of the gas supplied at the outlet (1100) as a blanket gas in a welding application or as a blanket and/or cutting gas in a plasma cutting machine, as a result of the chosen pulse rate, must be within acceptable limits. I.e. it must not be variations in the supply of the gas at the outlet 1100 that will affect the quality of the welding or the cutting processes.

In addition the application specific parameters X (300) and Y (400) can be included in the calculation based on user specific settings X and/or process feedback parameter(s) Y.

In the following, an embodiment of the invention involving the use of hardware regulation to determine the valve control signal will be explained with reference to FIGS. 3 and 4.

In a hardware solution, the ΔP (132) signal is fed into the block 133, and compared with an output signal from the a ramp generator 134. The magnitude of the output signal from the a ramp generator 134 is influenced by application specific parameters X and/or Y The ramp generator can be realized by a discrete hardware solution or by an timer circuit like the 555 tinier circuit. The amplitude and/or the offset of the ramped output signal from the ramp generator 134 will be influenced by X and/or Y either as a offset value or as a gain. This is normally user specific settings, but the resulting effect will be that a higher current 900, resulting in a higher value of the process specific feedback value Y, will require a higher level of gas flow. The influence of the user specific value X is that different welding or cutting operations will require different levels of gas flow. The parameters that will influence on the users setting of the X value is typical the material that is going to be welded or cut, the thickness of the material, the speed of the welding or cutting and the gas type used. The functionality of block 134, representing the process parameter Y and/or user input X is user/process specific, with the result of a ramped output voltage. When the ramp voltage at the negative input of 137 is lower than ΔP, then the PWM output 170 is high (OFF). When the ramp voltage is higher than ΔP then the output is low (ON).

Gas Leak Detection:

Gas leak detection of the gas flow line from the valve 110 of the flow controller of the invention to the output valve 800 of the welding apparatus. With both valves 110 and 800 closed, a constant pressure should normally be detected by the pressure sensor 140 at the output of the flow controller of the invention). If this pressure decreases with both valves 110 and 800 closed, this is useful as an indicator of a gas leak in the supply line between the valve of the flow controller of the invention and the output valve 800 of the welding apparatus.

Idle Gas Pressure Maintenance:

Filling the gas flow line (600) with a minimum pressure to make a quick start of gas supply to the gas outlet (1100) when starting a new welding or cutting operation. This is typically valid in situations where the current 900 is off and the valve 800 is closed. When a new welding or cutting operation is started, then the gas should be available at the gas outlet 1100 when the current 900 is starting. If not this can cause failure or poor quality on the operation to be performed.

The invention claimed is:

1. A shielding gas flow controller (100) for an electric arc welding apparatus for insertion into a shielding gas supply line between a shielding gas source (200) and a shielding gas valve (800) of the electric arc welding apparatus, the flow controller having a shielding gas (200) input and a shielding gas output (600), a controllable gas valve (110) connected between the shielding gas in- and outputs and having a control input (170), and a controller means having a first input (400) for receiving a welding signal representing an electrical welding arc current (900) of the welding apparatus during a welding operation and a gas flow setting control (300) means adapted to generate a flow setting output being function of the welding signal and representing a desired shielding gas flow, wherein the shielding gas flow controller further comprises an input pressure sensor (120) connected to the shielding gas input and arranged to provide a shielding gas input pressure measurement (150) to a second controller means input, and an output pressure sensor (140) connected to the shielding gas output and arranged to provide a shielding gas output pressure measurement to a third controller means input (160), and a flow setting output modifying means adapted to modify the flow setting output of the gas flow setting control means based on the shielding gas input and output pressure measurements, the welding signal, and a charateristic of the controllable valve into a control signal (170) for input to the control input of the controllable gas valve so as to maintain during the welding operation a substantially constant shielding gas flow in the shielding gas supply line to the welding apparatus corresponding to the flow setting output substantially independent of actual shielding gas input and output pressures at the shielding gas in- and outputs, respectively.

2. The shielding gas flow controller of claim 1, comprising
a means adapted to determine a time at which the welding operation is not being performed on basis of the welding signal (400), and
the controller means adapted to output to the controllable gas valve an idle control signal so as to maintain the output pressure (600) at a predetermined idle pressure level substantially during the time at which the welding operation is not being performed.

3. The shielding gas flow controller of claim 1, comprising a gas leak detector means adapted to be enabled during a period in which the welding operation is not being performed determined on basis of the welding signal, the gas leak detector means including a subtractor means arranged to subtract the shielding gas output pressure measurement from the shielding gas input pressure measurement and to provide a pressure difference value output, and a pressure difference comparator having a comparator output and arranged to receive on first and second comparator inputs the pressure difference value output and a predetermined pressure difference reference value, respectively, and a comparator output providing a leak indication when the pressure difference value is substantially at or greater than the predetermined pressure difference reference value.

4. The shielding gas flow controller of claim 2, comprising a gas leak detector means adapted to be enabled during a period in which the welding operation is not being performed determined on basis of the welding signal (400), the gas leak detector means including a reference value to be the predetermined idle pressure level of claim 2, the measured output pressure level being continuously compared with the reference value, and a comparator output providing a leak indication when the pressure difference value change is substantially at or greater than the predetermined pressure difference reference value for a given period of time, whereby the section (600) of the gas flow line is checked by this gas leak checking method.

5. The shielding gas flow controller of claim 1, further comprising a pressure level detector receiving the shielding gas input pressure measurement and being adapted to effect provisioning of a valve closing signal to the controllable gas valve so as to close the gas valve when the shielding gas input pressure measurement indicates a gas pressure being at or less than a predetermined shielding gas input pressure minimum level.

6. The shielding gas flow controller of claim 1, further comprising a gas leak detection means for detecting a gas leak in the gas flow line (600), (700) and (800) adapted to measure the gas output pressure at the output (140) of the valve (110) during the welding operation, and adapted to indicate a leak in the gas flow line if the measured gas output pressure drops below a predetermined gas output pressure threshold.

7. The shielding gas flow controller of claim 2, comprising a gas leak detector means adapted to be enabled during a period in which the welding operation is not being performed determined on basis of the welding signal, the gas leak detector means including a subtractor means arranged to subtract the shielding gas output pressure measurement from the shielding gas input pressure measurement and to provide a pressure difference value output, and a pressure difference comparator having a comparator output and arranged to receive on first and second comparator inputs the pressure difference value output and a predetermined pressure difference reference value, respectively, and a comparator output providing a leak indication when the pressure difference value is substantially at or greater than the predetermined pressure difference reference value.

8. The shielding gas flow controller of claim 2, further comprising a pressure level detector receiving the shielding gas input pressure measurement and being adapted to effect provisioning of a valve closing signal to the controllable gas valve so as to close the gas valve when the shielding gas input pressure measurement indicates a gas pressure being at or less than a predetermined shielding gas input pressure minimum level.

9. The shielding gas flow controller of claim 3, further comprising a pressure level detector receiving the shielding gas input pressure measurement and being adapted to effect provisioning of a valve closing signal to the controllable gas valve so as to close the gas valve when the shielding gas input pressure measurement indicates a gas pressure being at or less than a predetermined shielding gas input pressure minimum level.

10. The shielding gas flow controller of claim 2, further comprising a gas leak detection means for detecting a gas leak in the gas flow line (600), (700) and (800) adapted to measure the gas output pressure at the output (140) of the valve (110) during an welding operation, and adapted to indicate a leak in the gas flow line if the measured gas output pressure drops below a predetermined gas output pressure threshold.

11. The shielding gas flow controller of claim 3, further comprising a gas leak detection means for detecting a gas leak in the gas flow line (600), (700) and (800) adapted to measure the gas output pressure at the output (140) of the valve (110) during an welding operation, and adapted to indicate a leak in the gas flow line if the measured gas output pressure drops below a predetermined gas output pressure threshold.

* * * * *